US006699945B1

(12) United States Patent
Chen et al.

(10) Patent No.: US 6,699,945 B1
(45) Date of Patent: Mar. 2, 2004

(54) POLYCARBOXYLIC ACID BASED CO-BINDER

(75) Inventors: Liang Chen, New Albany, OH (US);
Kathleen M. Bullock, Zanesville, OH (US); William E. Downey, Granville, OH (US); Michael T. Pellegrin, Newark, OH (US); Yadollah Delaviz, Granville, OH (US); Kevin Guigley, Granville, OH (US); Harry B. Cline, Heath, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 8 days.

(21) Appl. No.: 10/308,427

(22) Filed: Dec. 3, 2002

(51) Int. Cl.[7] .......................... C08F 20/00; C08G 63/16
(52) U.S. Cl. ...................... 525/445; 528/272; 528/291; 528/296; 528/302; 528/303; 528/306; 528/335; 525/437; 525/444
(58) Field of Search ................... 528/272, 291, 528/296, 302, 303, 306, 335; 525/437, 444, 445

(56) References Cited

U.S. PATENT DOCUMENTS

| 4,002,700 | A | | 1/1977 | Fukuzaki et al. |
| 4,049,865 | A | | 9/1977 | Maaghul |
| 4,263,370 | A | | 4/1981 | Login |
| 5,318,990 | A | * | 6/1994 | Strauss ........................ 524/549 |
| 5,932,665 | A | | 8/1999 | DePorter et al. |
| 5,977,232 | A | | 11/1999 | Arkens et al. |
| 6,071,994 | A | | 6/2000 | Hummerich et al. |
| 6,099,773 | A | * | 8/2000 | Reck et al. .................. 264/109 |
| 6,114,464 | A | | 9/2000 | Reck et al. |
| 6,136,916 | A | | 10/2000 | Arkens et al. |
| 6,146,746 | A | | 11/2000 | Reck et al. |
| 6,221,973 | B1 | | 4/2001 | Arkens et al. |
| 6,274,661 | B1 | | 8/2001 | Chen et al. |
| 6,331,350 | B1 | * | 12/2001 | Taylor et al. ............... 428/221 |

* cited by examiner

*Primary Examiner*—Samuel A. Acquah
(74) *Attorney, Agent, or Firm*—Inger H. Eckert; Stephen W. Barns

(57) ABSTRACT

A formaldehyde free co-binder solution formed by using a polyol to crosslink polycarboxylic acid and a polyacid monomer is provided. In forming the co-binder solution, the polyacid monomer and the polyol are mixed in any conventional device with heat and agitation for a period of time sufficient for the chemicals to react and form a reaction product. The resultant product is then admixed with polycarboxylic acid to form a co-binder solution. In a preferred embodiment, the polyacid is maleic anhydride and the polyol is triethanolamine.

24 Claims, 5 Drawing Sheets

Triethanolamine Maleic Acid Ester and PAT Co-binder Stroke Cure ular weight of 1000 or less and a polyol having at least two
POLYCARBOXYLIC ACID BASED CO-BINDER

TECHNICAL FIELD AND INDUSTRIAL APPLICABILITY OF THE INVENTION

The present invention relates generally to formaldehyde free binders for use in the glass fiber manufacturing process, and more particularly, to a formaldehyde free co-binder solution formed by using a polyol to crosslink polyacrylic acid and a polyacid monomer or oligomer.

BACKGROUND OF THE INVENTION

Phenol-formaldehyde binders have been widely used to treat fiberglass since they have a low viscosity in the uncured state, yet form a rigid thermoset polymeric matrix for the glass fibers when cured. A low binder viscosity in the uncured state is required to allow the maximum vertical expansion of the coated mat when it exits the forming chamber. A binder which forms a rigid matrix when cured is required so that a finished fibrous glass thermal or acoustical insulation product, when compressed for packaging and shipping, will recover to its as-made vertical dimension when installed in a building.

The phenol/formaldehyde binder utilized in the past have typically been the highly alkaline resole type which have the combined advantages of inexpensive manufacture and water solubility. The binders are applied to the fiberglass from aqueous solution shortly after the fibers have been produced, and cured at elevated temperature in a curing oven. Under the curing conditions, any remaining aqueous solvent is evaporated, and the phenol/formaldehyde resole cures to a thermoset state. The fibers in the resulting fiberglass product are thus partially coated with a thin layer of thermoset resin, which tends to accumulate at the junctions where fibers cross each other. The resulting product therefore not only suffers from less self-abrasion, but also exhibits higher recovery than a fiberglass product not incorporating a binder.

The alkaline phenol/formaldehyde resoles contain a fairly large excess of formaldehyde from the manufacturing process. This excess of formaldehyde has been taken advantage of by adding urea to the phenol/formaldehyde resole, resulting in a urea-extended resole. Urea-extended phenol/formaldehyde binders are more cost-effective than the straight phenol/formaldehyde resins, but exhibit some loss in properties as the urea content increases. Thus, efforts have been made to incorporate other resins which can enhance the properties of the binder.

In particular, insulation manufacturers have long desired an alternative polymeric binder system for fibrous glass products. However, low molecular weight, low viscosity binders which allow maximum vertical expansion of the mat in the transfer zone generally cure to form a non-rigid plastic matrix in the finished product, thereby reducing the attainable vertical height recovery of the finished insulation product when installed. Conversely, high viscosity binders which generally cure to form a rigid matrix in the finished product do not allow maximum vertical expansion of the coated, uncured mat. Therefore, it is desirable to prepare a non-phenol/formaldehyde binder having a low viscosity when uncured and structural rigidity when cured.

SUMMARY OF THE INVENTION

Accordingly, an important object of the present invention is to provide a formaldehyde free co-binder solution that has a low viscosity before curing and structural rigidity after curing.

It is another object of the present invention to provide a formaldehyde free co-binder solution that is formed by using a polyol to crosslink polyacrylic acid and polyacid monomer or oligomers.

It is yet another object of the invention to provide formaldehyde free co-binder solutions that have a reduced molecular weight and reduced viscosity.

It is a feature of the present invention that the formaldehyde free binder solutions are cross-linked.

It is an advantage of the present invention that the amount of polycarboxylic acid used in the co-binder solution is reduced over conventional binder solutions, thereby reducing cost.

It is another advantage of the present invention that there is minimal precure of the co-binder solution on the glass fiber.

These and other objects, features, and advantages are accomplished according to the present invention by providing a method of forming a formaldehyde free co-binder solution that includes admixing a polyacid monomer or oligomer having at least two carboxylic acids and a molecular weight of 1000 or less and a polyol having at least two hydroxyl groups with agitation for a period of time sufficient for said polyacid monomer or oligomer and said polyol to react and form a reaction product. A polycarboxylic acid is then added to said reaction product to form a substantially crosslinked co-binder solution having a reduced viscosity and cure temperature.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
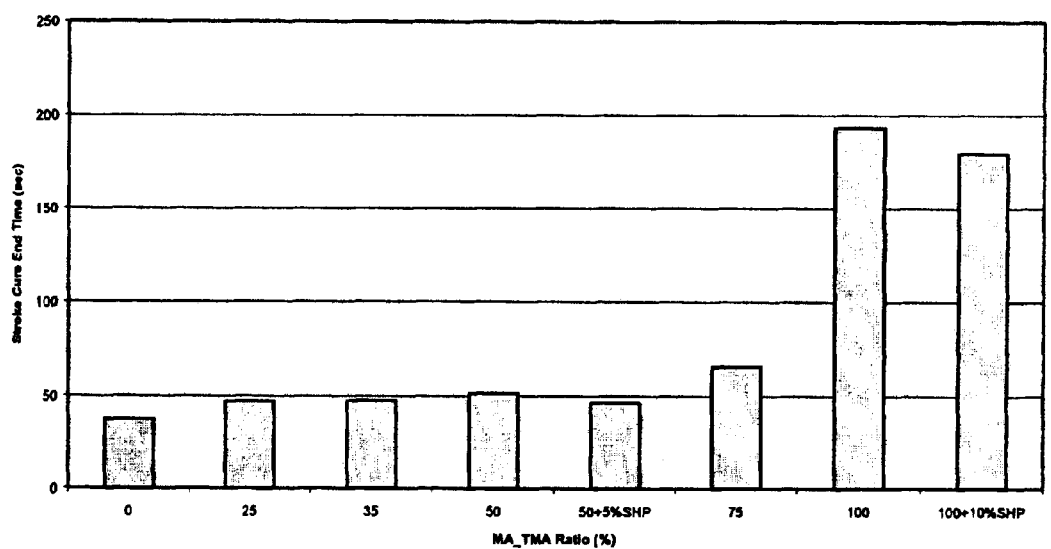
FIG. 1 is a graphical illustration of triethanolamine maleic acid ester and polyacrylic acid triethanolamine (PAT) co-binder stroke cure.

The present invention solves the aforementioned disadvantages and problems of the prior art by providing a formaldehyde free co-binder solution formed by using a polyol to crosslink polyacrylic acid and polyacid monomer or oligomers. This co-binder solution has a low molecular weight and reduced viscosity for improved performance. "Formaldehyde free co-binder solution" as used herein is meant to indicate that the composition is substantially free of formaldehyde and/or does not liberate substantial formaldehyde as a result of drying or curing.

The polyacids used in the formation of the co-binder solution are monomeric or oligomeric and have a minimum of two carboxylic acid groups. In addition, the polyacid has a molecular weight of from 50–1000. Suitable examples of polyacids for use in the present invention include monomers of maleic acid, maleic anhydride, maleic acid, fumaric acid, succinic acid, succinic anhydride, citric acid, adipic acid, glutaric acid, tartaric acid, itaconic acid, trimellitic acid, hemimellitic acid, trimesic acid, tricarballylic acid, 1,2,3,4-butanetetracarboxylic acid, pyromellitic acid, oligomers of carboxylic acid, the combination of acid and vinyl compounds, such as acrylic acid and vinyl acetate, and any combination of the forgoing ingredients. Preferably, the polyacid is a diacid such as maleic acid, maleic anhydride, fumaric acid, or itaconic acid. Most preferably, the diacid is maleic anhydride. Additionally, the polyacid should be compatible with an aqueous solution. Preferably, less than 35% of the polyacid is neutralized by a non-volatile base.

Representative polyols for use in the co-binder solution include triethanolamine, glycerine, ethylene glycol, pentaerythritol, trimethylol propane, sorbitol, sucrose, glucose, resorcinol, catechol, pyrogallol, 1,4-cyclohexane diol, monoethanolamine, diethanolamine, and certain reactive polyols with a molecular weight 1000 or below. Preferably, the polyol is triethanolamine or glycerine. In general, any polyol which has at least two hydroxyl groups that are reactive with an acid group to form an ester linkage can be used in the instant invention.

In forming the co-binder solution of the present invention, the polyacid monomer or oligomer and the polyol are mixed in any conventional device with heat and agitation for a period of time sufficient for the chemicals to react and form a partially esterified acid/alcohol system. Preferably, the polyacid monomer or oligomer and the polyol are agitated for 10 to 300 minutes, and more preferably from 30–60 minutes. The partially esterified acid/alcohol can then be admixed to a polycarboxylic acid binder (e.g., polyacrylic acid) to form the co-binder solution. Preferably, the polycarboxylic acid binder has a pH of 1.5–4.5.

Alternatively, the polyacid monomer or oligomer can be admixed with a polyol, such as triethanol amine or glycerol or both, without heat, to form an unreacted mixture. The mixture can be admixed with a polycarboxylic acid binder, again, without heat, to form the co-binder system without pre-reaction. In another embodiment, the polyacid monomer or oligomer, the polyol, and the polycarboxylic acid binder can be placed into the reaction vessel at the same time. The mixture is then heated with agitation to form the co-binder solution.

The active hydroxyl group to acid group molar ratio in the reaction product of the polyacid monomer or oligomer and the polyol can range from 0.2 to 1.5. In addition, the amount of the polyacid and polyol present can be up to 90% of the total composition. As a result, smaller quantities of polycarboxylic acid can be employed in the co-binder composition as compared to conventional binders, thereby resulting in a cost effective binder for manufacturers of glass fiber products. Another advantage of the co-binder system is that the low molecular weight acid ingredient in the co-binder system can act as a viscosity modifier. As the binder is dried in the fiberizing process, the water is evaporated and the binder becomes viscous. A high viscosity binder causes the fibers to stick to each other and produce a low and undesired ramp height for the uncured fiberglass blanket, which results in a reduced recovery height after cure. With the addition of a low molecular weight acid ingredient in the formation of the co-binder, the ramp height exiting the fiberizing process is higher than that of a conventional polyacrylic acid binder. This higher ramp height provides better fiber distribution on the vertical cross section and provides high stored energy when cured, which produced a higher recovery of the finished product.

Conventional polyacrylic acid binders, such as the binder disclosed in U.S. Pat. No. 5,932,665, are composed of a polyacrylic acid in which its chain is terminated by either sodium bisulfite or 2-proponal, triethanol amine or glycol as the cross-linking agent, and sodium hypophosphite as the esterification catalyst. For example, the binder disclosed in U.S. Pat. No. 5,932,665 blended polyacrylic acid with maleic acid at weight ratio 1:0.5, and cured the binder with glycerol at an acid:hydroxyl ratio of 1:1. Such conventional binders have a two step cure, i.e., the polyacrylic acid binder cures at 210° C. and above and the maleic hydride begins crosslinking at 260° C. This indicates that the maleic acid needs to be cured at an elevated temperature, for example, a temperature above 260° C.

On the other hand, the co-binder according to the present invention utilizes a phosphite terminated polyacrylic acid binder system which includes a low molecular weight polyacrylic acid (chain terminated by sodium hypophosphite) and glycerol or triethanol amine without any additional esterification catalysts. Since sodium hypophosphite is already used as the chain termination agent and is built in the polyacrylic acid backbone, the energy required for esterification is reduced and the cure on-set temperature is reduced to approximately 150° C. This reduction in the cure temperature for the co-binder system is significant and surprising, especially in view of the disclosure set forth in U.S. Pat. No. 5,932,656. Because it was believed that the reactivity of hypophosphite was consumed during the polymer chain terminating reaction, further addition of esterification accelerator was necessary for the crosslinking reaction to take place around 210° C.

The reaction of the polyol described above can be illustrated in the following reaction scheme in which maleic anhydride is used as the polyacid monomer and triethanolamine is used as the polyol.

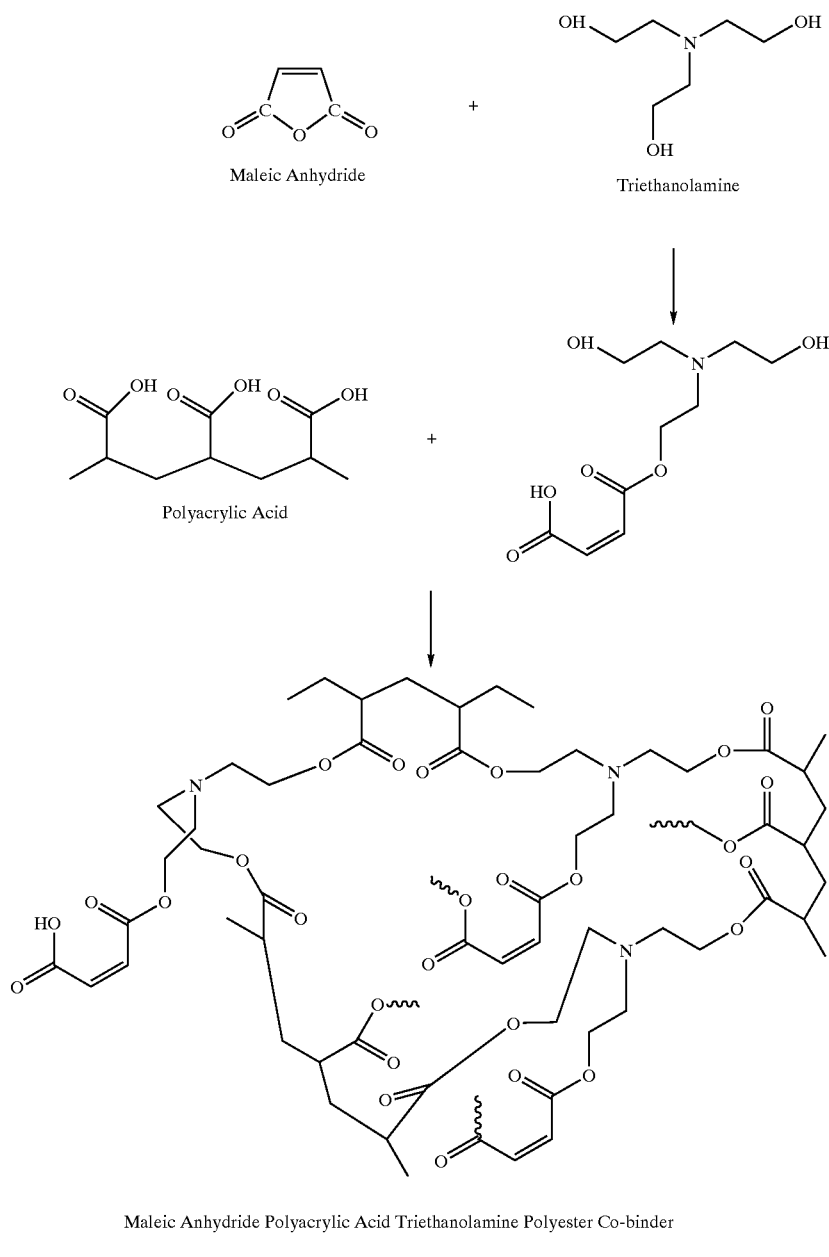

Maleic Anhydride Polyacrylic Acid Triethanolamine Polyester Co-binder

Water may be added to the co-binder solution in an amount suitable to produce an aqueous binder having a flow rate suitable for its application to the glass fibers. In particular, the co-binder solution of the present invention may be applied to glass fibers by conventional techniques such as air or airless spraying, padding, saturating, roll coating, curtain coating, beater deposition, coagulation, and the like.

The formaldehyde-free curable co-binder solution may contain an accelerator to aid in the curing of the co-binder. Curing is meant herein to denote a structural or morphological change which is sufficient to alter the properties of a flexible, porous substrate to which an effective amount of polymeric binder has been applied, such as, for example, covalent chemical reaction, ionic interaction or clustering, improved adhesion to the substrate, phase transformation or inversion, hydrogen bonding, and the like. The accelerator may be, for example, an alkali metal hypophosphite salt, an alkali metal phosphite, an alkali metal polyphosphate, an alkali metal dihydrogen phosphate, a polyphosphoric acid, and an alkyl phosphinic acid. The accelerator may be used at a level of from 0 to 20% by weight based on the binder solid. Preferably, the accelerator is present in an amount of from 1 to 7% weight based on solid content.

The co-binder solution may also contain conventional treatment components including, but not limited to, emulsifiers, pigments, fillers, anti-migration aids, curing agents, coalescents, wetting agents, biocides, plasticizers, organosilanes, antifoaming agents, colorants, waxes, dust suppressing agents, and anti-oxidants. The co-binder composition may further include fire retardants, such as aluminum silicates, aluminum hydroxides, borates, and/or phosphates.

In operation, the co-binder solution is applied to glass fibers by any of the conventional methods described above. The formaldehyde free co-binder solution is substantially thermoplastic, or substantially uncrosslinked, when it is applied to the glass fibers. After the co-binder is applied to the glass fibers, it is heated to effect drying (e.g., evaporation of water) and curing. Once heated to a temperature sufficient to effect curing, the co-binder becomes thermosetting and is substantially crosslinked.

The co-binder of the present invention is typically applied to glass fibers as they are being produced. As described in U.S. Pat. No. 5,340,868, the contents of which are incorporated herein by reference, it is generally well-known in the art to produce a porous mat of fibrous glass by fiberizing molten glass and immediately forming a fibrous glass mat on a moving conveyor. In particular, glass is melted in a tank and supplied to a fiber forming device such as a spinner or a bushing. Fibers of glass are attenuated from the device and are blown generally downwardly within a forming chamber. The glass fibers typically have a diameter from about 2 to about 9 microns and have a length from about ¼ inch to about 3 inches. Preferably, the glass fibers range in diameter from about 3 to about 6 microns, and have a length from about ½ inch to about 1½ inches.

The glass fibers are deposited onto a perforated, endless forming conveyor. In one exemplary embodiment of the present invention, the co-binder is applied to the glass fibers as they are being formed by means of suitable spray applicators so as to result in a distribution of the binder throughout the formed mat of fibrous glass. The glass fibers, having the uncured, uncrosslinked co-binder adhered thereto, are gathered and formed into a mat on the endless conveyor within the forming chamber with the aid of a vacuum drawn through the mat from below the forming conveyor. The residual heat contained in the glass fibers as well as the air flow through the mat causes a majority of the water to volatilize from the mat before it exits the forming chamber.

As the fibrous glass mat emerges from the forming chamber, it expands vertically due to the resiliency of the glass fibers. The expanded mat is then conveyed to and through a curing oven where heated air is passed through the mat to cure the co-binder. Flights above and below the mat slightly compress the mat to give the finished product a desired thickness and surface finish. Although the cure on-set temperature is 150° C., curing is typically effected at a temperature of from 177–343° C. Generally, the mat resides within the oven for a period of time sufficient to crosslink the co-binder, e.g., 30 seconds to 5 minutes, depending upon the production rate and line set-up.. Once the curing process is complete, a finished fibrous glass mat is produced which may be used as a thermal or acoustical insulation product, a reinforcement for a subsequently produced composite, or other suitable glass fiber product.

Unlike conventional binders which commonly employ large amounts of polycarboxylic acid, the co-binder solution of the present invention uses a reduced amount of polycarboxylic acid. Therefore, the co-binder solution is a cost effective binder solution. In addition, the co-binder solution of the present invention has many advantages. For example, glass fibers cured with the co-binder possess high-end of line recovery and better stiffness. The co-binder system will also improve the manufacture operation by reducing the stickiness in the fiber forming chamber Having generally described this invention, a further understanding can be obtained by reference to certain specific examples illustrated below which are provided for purposes of illustration only and are not intended to be all inclusive or limiting unless otherwise specified.

EXAMPLE 1

Preparation of Triethanolamine Maleic Acid Ester 25.2 g of triethanolamine (98% pure, Aldrich) was added into a 500 mL glass beaker. The beaker was heated to 50° C. on a hot plate with magnetic agitation. 24.8 g of maleic anhydride briquett (100%, Huntsman) was then added to the triethanolamine. After all the maleic anhydride was dissolved, the mixture was maintained at 110° C. for additional 5 minutes. This partially reacted triethanolamine maleic acid ester was diluted with water to get a 50% solid solution Preparation of Triethanolamine Maleic Acid Estar and Polyacrylic Acid Co-Binder The co-binder was prepared by adding self-catalytic polyacrylic acid (Acumer 9932 from Rohm and Haas) to the above-prepared triethanolamine maleic acid ester as indicated in Table 1.

TABLE 1

| Example | PAT | MT | Water | Begin | End | Stroke Cure 2 Begin | Stroke Cure 2 End | Stroke Cure 3 Begin | Stroke Cure 3 End | Average Begin | Average End |
|---|---|---|---|---|---|---|---|---|---|---|---|
| 1 | 100:0 | 12.0 | 0 | 8.0 | 14 | 36 | 14 | 41 | 14 | 35 | 14 | 37 |
| 2 | 75:25 | 9.0 | 3.0 | 8.0 | 24 | 48 | 25 | 45 | 24 | 48 | 24 | 47 |
| 3 | 65:35 | 7.8 | 4.2 | 8.0 | 27 | 48 | 28 | 49 | 28 | 45 | 28 | 47 |
| 4 | 50:50 | 6.0 | 6.0 | 8.0 | 42 | 50 | 46 | 54 | 44 | 50 | 44 | 51 |
| 5 | 75:25 | 3.0 | 9.0 | 8.0 | 61 | 67 | 58 | 63 | 63 | 67 | 61 | 66 |
| 6 | 0:100 | 0 | 12.0 | 8.0 | N/A | 195 | N/A | 200 | N/A | 185 | N/A | 193 |
| 7 | 6 + 10% SHP | 0 | 12.0 | 8.0 | 160 | 175 | 170 | 185 | | | 165 | 180 |
| 8 | 4 + 5% SHP | 6.0 | 6.0 | 8.0 | 42 | 48 | 40 | 45 | | | 41 | 47 |

PAT = Polyacrylic acid triethanol amine binder
MT = Maleic anhydride triethanol amine ingredients
SHP = Sodium hypophosphite Cure Determination The cure performance for the above-prepared co-binders were determined by stroke cure and by dynamic mechanic analysis as described below.

Stroke Cure

A stroke cure hot plate was heated and maintained at surface temperature at 190° C. A 30% solid co-binder solution was prepared by diluting the above prepared co-binder with water. 2 mL of the co-binder solution was dropped onto the hot plate surface and the timer was started. As the water in the binder was evaporated and stirred by a spatula, the crosslinking reaction took place and fibers were formed. A good indication that the crosslinking reaction was complete was when fibers could no longer be drawn out of the hot plate. The time for to reach the fiber breaking point was recorded for each of the co-binder formulations. The results are set forth in Table 1 above.

Dynamic Mechanical Analysis (DMA)

The dynamic mechanical analysis (DMA) results of all of the examples shown in Table 1 are illustrated in FIG. 1. FIG. 1 clearly illustrates that as maleic acid was added to the system, the module increase during the drying process (first bump) was decreased significantly. This implies that the degree of stickiness of bindered fiber to fiber forming convey can be reduced and manufacture efficiency will be improved. Additionally, FIG. 1 illustrates that the triethanolamine maleic anhydride polyacrylic acid co-binders have a similar cure performance as that of the triethanolamine polyacrylic acid binder itself. This comparable cure performance indicates the ability to use maleic anhydride as a lower cost crosslinking ingredient.

EXAMPLE 2

Triethanolamine Maleic Acid Blend Preparation

Triethanolamine (99% pure, Aldrich) and water as specified in Table 2 was added into a 500 ml beaker for each of the following examples. The beaker was heated to 50° C. on a hot plate with magnetic agitation. A preweighed amount of maleic anhydride briquett (100%, Huntsman) was then added to the triethanolamine water solution. After all the maleic anhydride was dissolved, the mixture was cooled and was ready for further blending.

Triethanolamine Maleic Acid Blend And Polyacrylic Acid Co-Binder

The co-binder was prepared by adding a self-catalytic polyacrylic acid (Acumer 9932 from Rohm and Haas), to the above-prepared triethanolamine maleic acid blend as indicated in Table 2.

Stroke Cure And DMA

Figure 2:
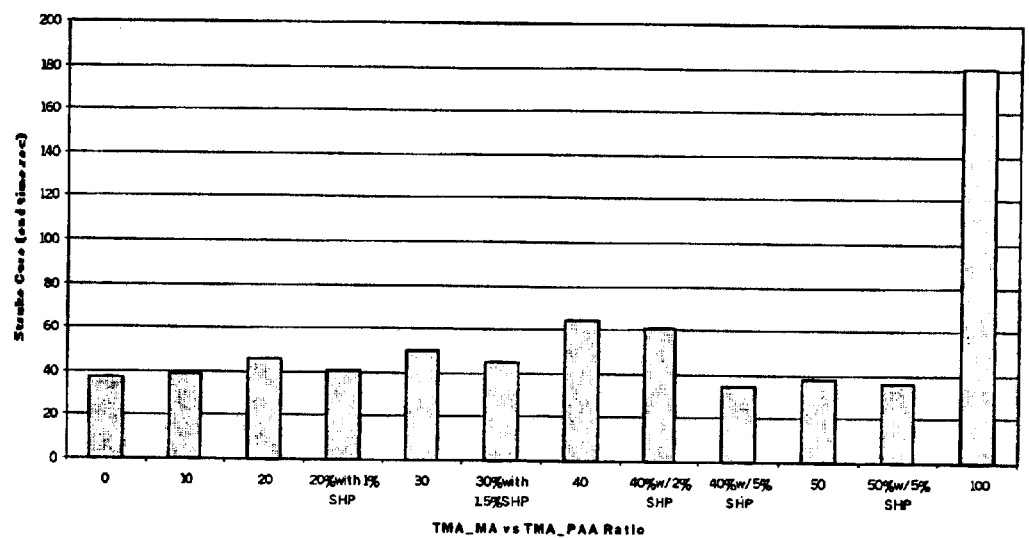
FIG. 2 is a graphical illustration of triethanolamine maleic acid and polyacrylic acid co-binder stroke cure.

The stroke cure for each set point was conducted and the results were listed in Table 2. The DMA profile for each formulation was illustrated in FIG. 2. The results showed a similar trend to Example 1.

TABLE 2

Triethanolamine maleic acid blend and polyacrylic acid co-binder Stroke Cure

| Example | TMA_MA Ratio | Total Wt | Solid | PAA | TEA | MA | Water | Stroke Cure (sec) | | | Average |
|---|---|---|---|---|---|---|---|---|---|---|---|
| | 0 | 100 | 50.00 | 82.92 | 11.86 | 0.00 | 5.22 | 33 | 35 | 44 | 37.3 |
| | 10 | 100 | 50.00 | 74.63 | 13.19 | 2.48 | 9.70 | 43 | 35 | 39 | 39.0 |
| | 20 | 100 | 50.00 | 66.34 | 14.52 | 4.96 | 14.18 | 47 | 44 | 46 | 45.7 |
| | 20% with 1% SHP | | | | | | | 37 | 42 | 43 | 40.7 |
| | 30 | 100 | 50.00 | 58.05 | 15.85 | 7.45 | 18.66 | 45 | 52 | 52 | 49.7 |
| | 30% with 1.5% SHP | | | | | | | 42 | 43 | 49 | 44.7 |
| | 40 | 100 | 50.00 | 49.75 | 17.18 | 9.93 | 23.13 | 56 | 59 | 77 | 64.0 |
| | 40% w/2% SHP | | | | | | | 55 | 59 | 70 | 61.3 |
| | 40% w/5% SHP | | | | | | | 30 | 33 | 42 | 35.0 |
| | 50 | 100 | 50.00 | 41.46 | 18.52 | 12.41 | 27.61 | 37 | 38 | 40 | 38.3 |
| | 50% w/5% SHP | | | | | | | 36 | 39 | 35 | 36.7 |
| | 100 | 100 | 50.00 | 0.00 | 25.18 | 24.82 | 50.00 | 170 | 190 | 182 | 180.7 |

TMA = triethanolamine maleic acid
MA = maleic acid
SHP = Sodium hypophosphite
PAA = polyacrylic acid
TEA = triethanol amine

EXAMPLE 3

A production trial using polyacrylic acid maleic anhydride cobinders was conducted. The R-19 insulation battes were made using a typical plant operation parameters, which would be known by one of ordinary skill in the art. The following binders were employed and targeted at the same LOI:

Phenolic binder: Existing standard urea extended phenol/formaldehyde binder

PAT Plus: Phosphite terminated polyacrylic acid/triethanol amine binder

PAT Plus_MA/TEA (25%): 75% PAT Plus binder blended with 25% maleic dry weight based) to form a co-binder.

Acrodur 3530: BASF polycarboxylic acid/triethanol amine binder (proprietary)

Acrodur 3530_MA/TEA (25%): 75% Acrodur 3530 binder blended with 25% maleic anhydride/triethanol (dry weight based) to form a co-binder.

The experimental binders were prepared by blending the ingredients together, including all the additives, such as a dust suppressing oil, an emulsifier, a wetting agent, a colorant, etc. The binders were diluted with water to make the solid content approximately 10%. The binders were sprayed onto the glass fibers as they were formed. The fibers were laid on the convey and formed an uncured blanket. For the maleic anhydride co-binder set points, the ramp height for the uncured blanket was 1–2 inches higher than that of binders without maleic anhydride. Further, the pack was opened very easily, thereby indicating a lower viscosity, which helps to reduce the stickness between the uncured fiber blanket and the convey. In addition, the low viscosity helps to keep the high uncured ramp height for better fiber weight distribution and for better finished product performance.

Figure 3:
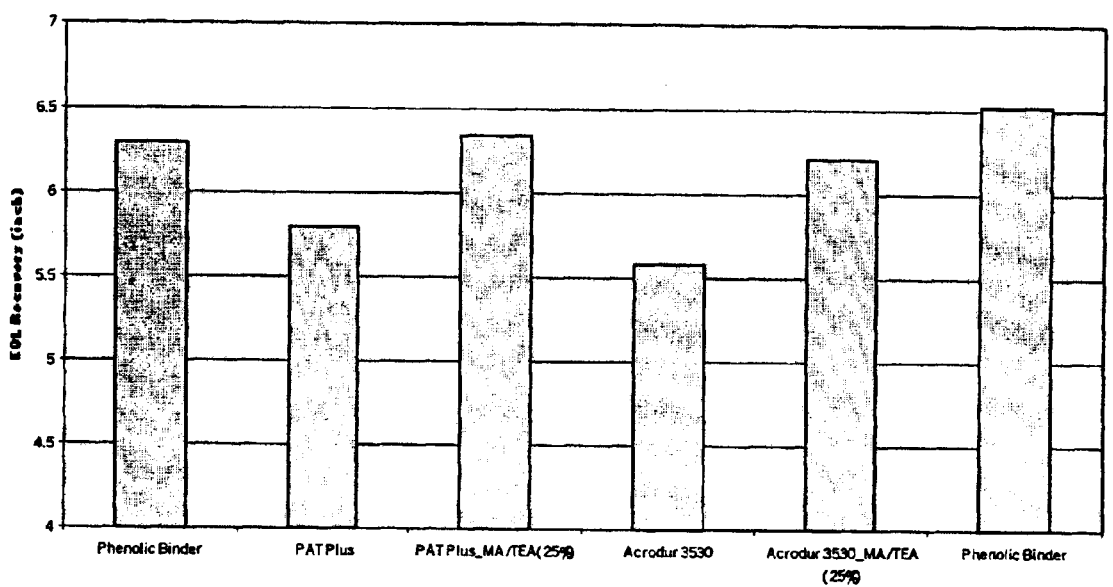
FIG. 3 is a graphical illustration of the end of line recovery of various maleic anhydride cobinders according to the principles of the present invention.
Figure 4:
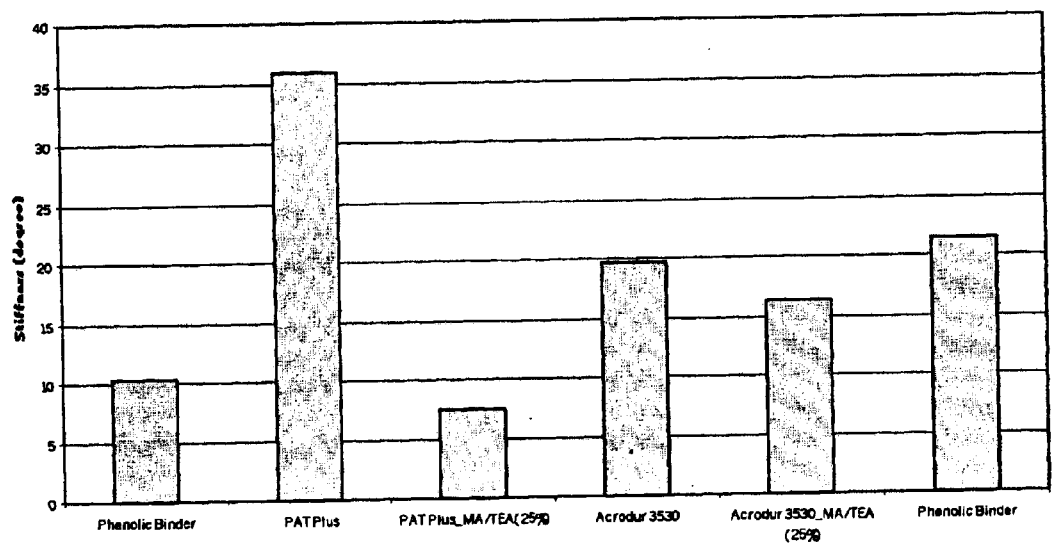
FIG. 4 is a graphical illustration of the end of line insulation product stiffness of various maleic anhydride cobinders according to the principles of the present invention.

The end of line recovery was conducted after the product was packaged and then opened to measure the blanket height for its thermal and acoustic performance. Higher loft is desirable. Stiffness is a measure designed to maintain certain rigidity of the blanket for installers to put onto wall more efficiently. In general, the lower degree of the measured bent angle, the better the product rigidity. The data shown below in Table 3 and in FIGS. 3 and 4 clearly indicate the unexpectedly improved and superiority when the co-binder systems according to the principles of the present invention are used. This trial data also showed the improvement for co-binder systems according to the present invention over the traditional original binders. In particular, the MA/TEA added co-binder showed higher end of line recovery compared to a binder without MA/TEA. For example, PAT Plus with MA/TEA showed a 6.35 inch end of line recovery while PAT Plus itself only showed a 5.80 inch end of line recovery. Similarly, PAT Plus with MA/TEA showed an 8 degree bending angle of end of line recovery whereas PAT Plus itself had 16 degree bending angle. This is a significant improvement on the blanket rigidity.

TABLE 3

Polycarboxylic Maleic Co-binder Production Trial Data

| Binder Type | Recovery (inch) | Stiffness (degree) |
| --- | --- | --- |
| Phenolic Binder | 6.30 | 10 |
| PAT Plus | 5.80 | 36 |
| PAT Plus MA/TEA (25%) | 6.35 | 8 |
| Acrodur 3530 | 5.58 | 20 |
| Acrodur 3530 MA/TEA (25%) | 6.22 | 16 |
| Phenolic Binder | 6.52 | 21 |

Production Trial

Figure 5:
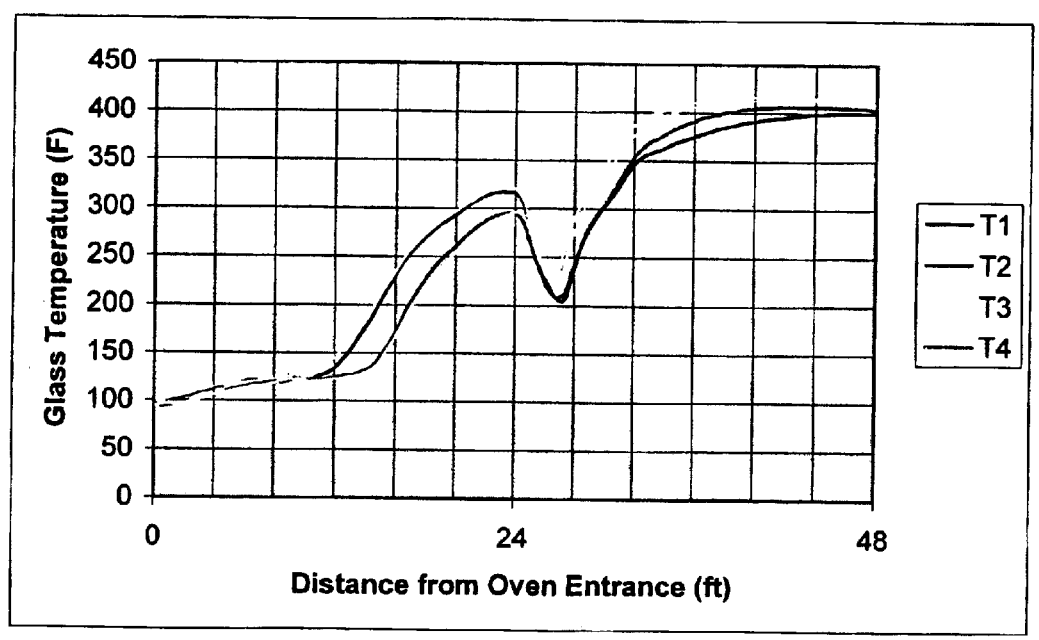
FIG. 5 is a graphical illustration of the cure temperatures for the co-binder system in a production trial according to the principles of the present invention.

In a production trial, four thermal probes were inserted into an uncured fiberglass blanket as it was entering the cure oven. An oven Mole recorded the temperature profile as the probes traveled through the curing oven. The difference of the temperature profiles reflected the location difference of the four probes. As the fiber glass blanket entered the oven, the temperature was raised to evaporate any residual moisture. Once the co-binder started to cure, the oven temperature was stabilized until co-binder was completely cured. For the maleic acid co-binder system of the present invention, the temperature of the production oven was set at 420° F (i.e., 216° C.) and the highest actual pack temperature (i.e., the temperature to which the glass fiber and co-binder were exposed) was approximately 410° F. (i.e., 210° C.) as shown in the graph displayed in FIG. 5. Thus, the cure on-set temperature is approximately 195–210° C. As discussed above, this low curing temperature is a surprising and unexpected result, especially when taken in consideration of conventional binder systems such as that disclosed in U.S. Pat. No. 5,932,665.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of forming a formaldehyde free co-binder solution comprising the steps of:

admixing a polyacid monomer or oligomer having at least two carboxylic acids and a molecular weight of 1000 or less and a polyol having at least two hydroxyl groups with agitation for a period of time sufficient for said polyacid monomer or oligomer and said polyol to react and form a reaction product;

adding a polycarboxylic acid binder to said admixture containing said reaction product;

permitting said reaction product and said polycarboxylic acid binder to react and form a co-binder solution having a reduced viscosity and a reduced cure temperature.

2. The method of claim 1, wherein said polyacid monomer or oligomer is selected from the group consisting of maleic acid, maleic anhydride, fumaric acid, succinic acid, succinic anhydride, citric acid, tartaric acid, adipic acid, glutaric acid, itaconic acid, trimellitic acid, hemimellitic acid, trimesic acid, tricarballylic acid, 1,2,3,4-butanetetracarboxylic acid, pyromellitic acid, oligomers of carboxylic acid, acrylic acid, vinyl acetate and any combination thereof.

3. The method of claim 1, wherein said polyol is reactive with an ester group to form an ester linkage.

4. The method of claim 1, wherein said polyol is selected from the group consisting of triethanolamine, glycerine, ethylene glycol, pentaerythritol, trimethylol propane, sorbitol, sucrose, glucose, resorcinol, catechol, pyrogallol, 1,4-cyclohexane diol, monoethanolamine and diethanolamine.

5. The method of claim 4, wherein said polyol is selected from the group consisting of triethanolamine and glycerine.

6. The method of claim 1, wherein said polycarboxylic acid binder has a pH of 1.5–4.5.

7. The method of claim 1, wherein said polyacid is maleic acid, said polyol is triethanolamine, said reaction product is triethanolamine maleic acid ester, and said co-binder solution includes a maleic anhydride polyacrylic acid triethanolamine polyester co-binder.

8. The method of claim 1, wherein said period of time is from 10 to 300 minutes.

9. The method of claim 1, wherein said polycarboxylic acid binder is terminated by sodium hypophosphite.

10. The method of claim 1, wherein said cure temperature is approximately 150° C.

11. A method of forming a formaldehyde free polycarboxylic acid based co-binder solution comprising the steps of:

admixing a polyacid monomer or oligomer having at least two carboxylic acids and a molecular weight of 1000 or less, a polyol having at least two hydroxyl groups, and a polycarboxylic acid binder with agitation to form an admixture;

heating said admixture for a period of time sufficient to form a co-binder solution having a reduced viscosity and a reduced cure temperature of approximately 150° C.

12. The method of claim 11, wherein said polyacid monomer or oligomer is selected from the group consisting of maleic acid, maleic anhydride, fumaric acid, succinic acid, succinic anhydride, citric acid, tartaric acid, adipic acid, glutaric acid, itaconic acid, trimellitic acid, hemimellitic acid, trimesic acid, tricarballylic acid, 1,2,3,4-butanetetracarboxylic acid, pyromellitic acid, oligomers of carboxylic acid, acrylic acid, vinyl acetate and any combination thereof.

13. The method of claim 11, wherein said polyol is selected from the group consisting of triethanolamine, glycerine, ethylene glycol, pentaerythritol, trimethylol propane, sorbitol, sucrose, glucose, resorcinol, catechol, pyrogallol, 1,4-cyclohexane diol, monoethanolamine and diethanolamine.

14. The method of claim 11, wherein said polycarboxylic acid binder has a pH of 1.5–4.5.

15. The method of claim 11, wherein said polyacid is maleic acid, said polyol is triethanolamine, said reaction product is triethanolamine maleic acid ester, and said co-binder solution includes a maleic anhydride polyacrylic acid triethanolamine polyester co-binder.

16. The method of claim 11, wherein said period of time is from 10 to 300 minutes.

17. The method of claim 11, wherein said polycarboxylic acid binder is terminated by sodium hypophosphite.

18. A composition for forming a formaldehyde free co-binder solution comprising:

a polyacid monomer or oligomer having at least two carboxyl groups and a molecular weight of less than 1000;

a polyol having at least three hydroxyl groups; and a polycarboxylic acid binder having a pH of from 1.5–4.5;

wherein an active hydroxyl group to acid group molar ratio is from 0.2–1.5.

19. The composition of claim 18, wherein said polyol is reactive with an ester group to form an ester linkage.

20. The composition of claim 19, wherein said polyol is selected from the group consisting of triethanolamine, glycerine, ethylene glycol, pentaerythritol, trimethylol propane, sorbitol, sucrose, glucose, resorcinol, catechol, pyrogallol, 1,4-cyclohexane diol, monoethanolamine and diethanolamine.

21. The composition of claim 18, wherein said polyacid monomer or oligomer is selected from the group consisting of maleic acid, maleic anhydride, fumaric acid, succinic acid, succinic anhydride, citric acid, tartaric acid, itaconic acid, trimellitic acid, hemimellitic acid, trimesic acid, tricarballylic acid, 1,2,3,4-butanetetracarboxylic acid, pyromellitic acid, oligomers of carboxylic acid, acrylic acid, vinyl acetate and any combination thereof.

22. The composition of claim 18, wherein an amount of said polyacid and said polyol present in said composition is up to 90% of the total composition.

23. The composition of claim 18, wherein said polycarboxylic acid binder is terminated by sodium hypophosphite.

24. The composition of claim 18, further comprising an accelerator to aid in curing of said co-binder.

* * * * *